UNITED STATES PATENT OFFICE.

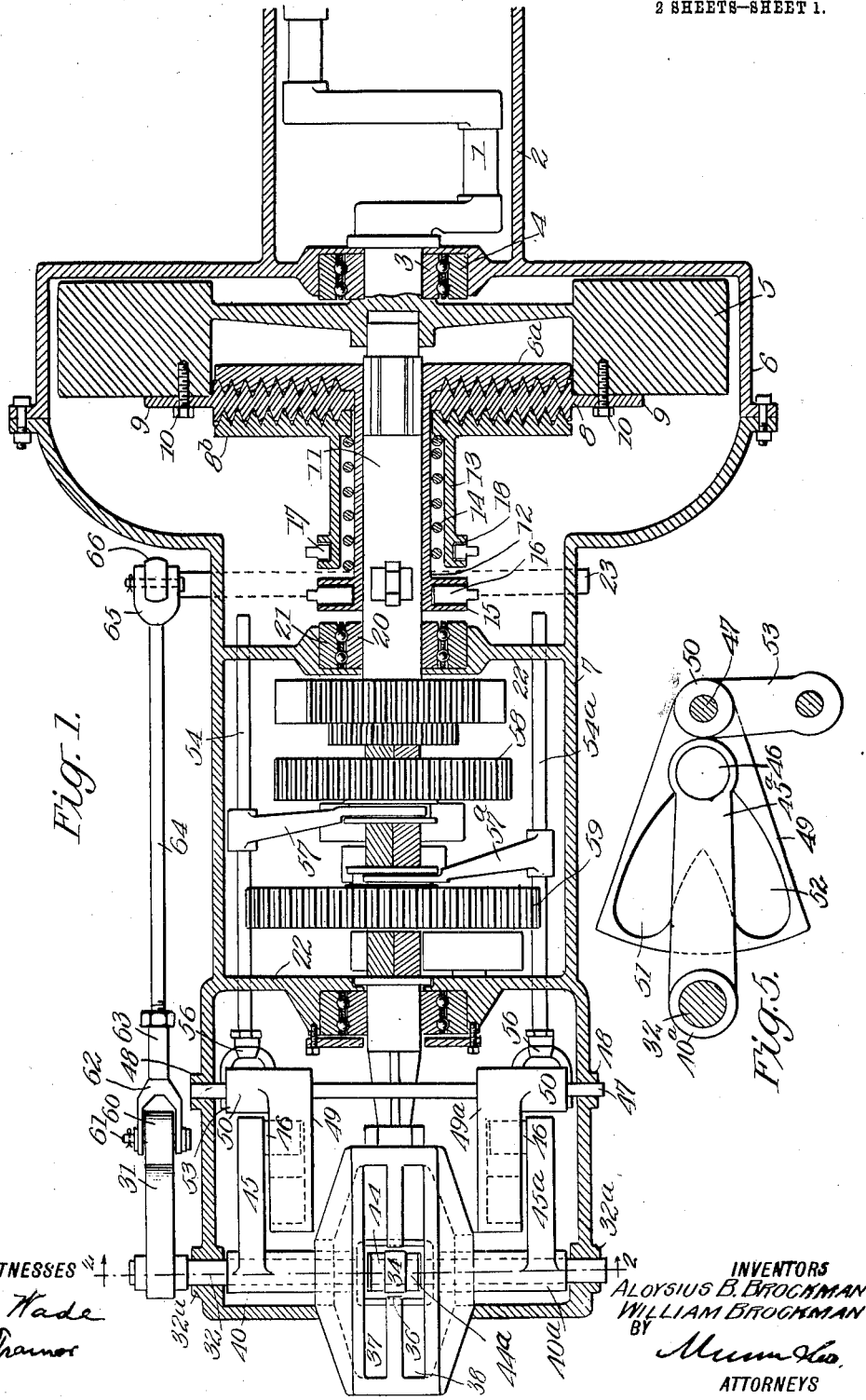

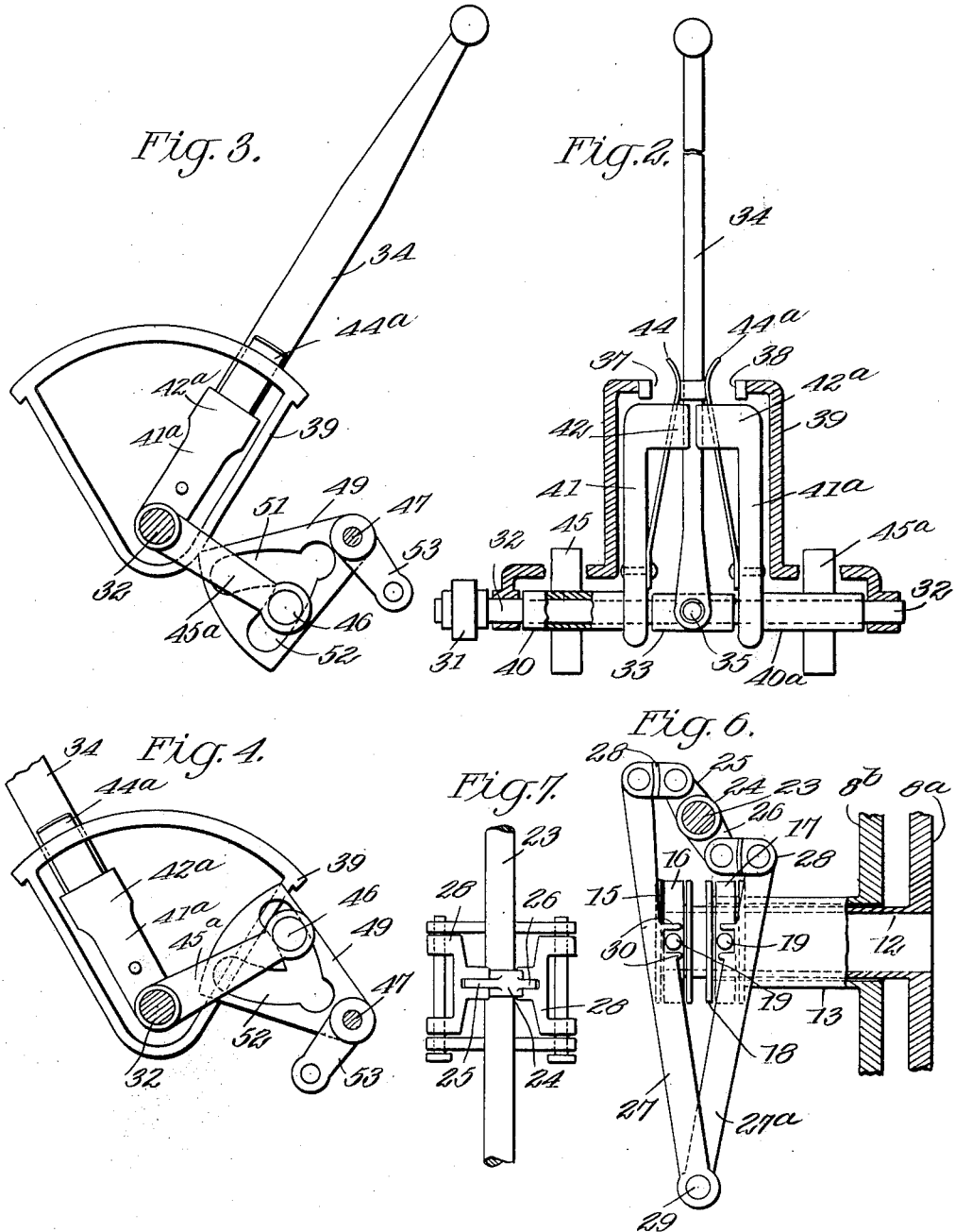

ALOYSIUS B. BROCKMAN AND WILLIAM BROCKMAN, OF LAWRENCE, NEBRASKA.

TRANSMISSION MECHANISM.

1,089,186.  Specification of Letters Patent.  Patented Mar. 3, 1914.

Application filed June 14, 1912. Serial No. 703,692.

*To all whom it may concern:*

Be it known that we, ALOYSIUS B. BROCKMAN and WILLIAM BROCKMAN, of Lawrence, county of Nuckolls, and State of Nebraska, have invented certain new and useful Improvements in Transmission Mechanism, of which the following is a specification.

Our invention is an improvement in transmission mechanisms, and has for its object the provision of an operating mechanism of the character specified, of the fewest possible parts and of the simplest type, wherein a selective lever is provided for controlling both the clutch and the gear transmission mechanism, and wherein when the selective lever is in neutral position, the gear transmission mechanism is out of mesh, and when moved out of neutral position the selected gear is first fully engaged before the clutch is permitted to close, and wherein the gears are always positively locked with respect to the operating lever, and which will be reliable, durable, and easily operated.

In the drawings: Figure 1 is a horizontal section of the transmission mechanism; Fig. 2 is a section on the line 2—2 of Fig. 1; Fig. 3 is a side view of Fig. 2, showing the parts in one position; Fig. 4 is a similar view, showing the parts in another position; Fig. 5 is an enlarged view of the cam; Fig. 6 is a side view of the clutch operating mechanism; and, Fig. 7 is a partial plan view of Fig. 6.

In the present embodiment of the invention, the crank shaft 1 is arranged in the crank case 2, and the said shaft is held in a bushing 3, journaled in a ball bearing 4. The fly wheel 5 is secured to the shaft in an enlargement 6 in a casing 7 which incloses the transmission mechanism, to be described. One section 8 of a clutch is secured to the fly wheel, by means of a flange 9 on the section which laps on the rim of the wheel, and is secured thereto by screws 10. The other sections $8^a$ and $8^b$ of the clutch are arranged on opposite sides of the section 8, and each is secured to a sleeve, encircling a shaft 11 arranged in alinement with the shaft 1. The sleeve 12 of section $8^a$ is adjacent to the shaft 11, and the sleeve 13 of the section $8^b$ is spaced apart from sleeve 12, and a coil spring 14 is arranged between the sleeves. The spring bears at one end against the section $8^b$, and at the other against the end of sleeve 12, and tends to force the sections $8^a$ and $8^b$ toward the section 8.

Each sleeve is provided with an annular groove at the end remote from the clutch, each groove being formed by a pair of annular spaced ribs, at the end of the shaft. A ring 16 is arranged in the groove 15 of sleeve 12, and a similar ring 17 is arranged in the groove 18 of sleeve 13. Each ring is provided with oppositely arranged trunnion or journal pins 19.

The shaft 11 is provided with a bushing 20, at the opposite end of the sleeves 12 and 13, from bushing 3, and the said bushing 20 is journaled in a ball bearing 21, in a cross web or diaphragm 22 in the casing 7. The sleeves 12 and 13 are operated by a shaft 23, journaled transversely of the casing 7, and provided adjacent to the shaft 11 with a hub 24, having oppositely extending arms 25 and 26, (Figs. 6 and 7).

A pair of yoke-shaped levers 27 and $27^a$ are provided for moving the sleeves 12 and 13, the body of each lever being connected by means of a link 28, with the adjacent arm of the hub. The lever 27 is connected to arm 25, and the lever $27^a$ to arm 26. The arms of the levers 27 and $27^a$ are pivoted to a common shaft 29, and each of the said arms 27—$27^a$ is provided with a pair of laterally extending spaced lugs 30 engaging opposite sides of the adjacent trunnion 19.

The levers 27 and $27^a$ are arranged on opposite sides of the grooves 15 at the ends of the sleeves, and it will be evident that when the shaft 23 is oscillated, the sleeves 12 and 13 will be operated to move the clutch sections $8^a$ and $8^b$ together, or away from each other, depending upon the direction in which the shaft is oscillated.

The shaft 23 is operated by a cam 31, secured on the extended end of a shaft 32, journaled in bearings $32^a$ in the casing 7, at the end remote from the flywheel. A sleeve 33 is secured on the shaft at approximately its center, and a selective lever 34 is pivoted to the sleeve, as shown at 35, for swinging movement longitudinally of the shaft.

The lever 34 in its neutral position, is in the connecting portion or passage 36, between two parallel laterally spaced guideways 37 and 38 in the wall of an upward extension 39 of the casing 7. When the lever is in the passage 36 it can swing longitudinally of the shaft, but can not swing angularly thereof, and when in either guideway the lever can swing angularly, but cannot swing longitudinally of the shaft.

Sleeves 40 and 40$^a$ are journaled on the shaft 32, one on each side of lever 34, and each sleeve is provided with an engaging jaw, comprising an arm 41, 41$^a$, arranged radially of the sleeve and provided with a lateral lug 42, 42$^a$ at its upper end. The lugs 42 and 42$^a$ are in position for engagement by the lever when the lever is in the adjacent guideway.

Springs 44 and 44$^a$ are secured to the respective arms 41 and 41$^a$, and each spring bears at its free end against the adjacent side of the lever, and acts normally to hold the lever in the pasage 36, that is, in neutral position. Arms 45 and 45$^a$ are secured to the respective sleeves 40 and 40$^a$ at their outer ends, and each arm is provided with a laterally extending pin 46 in its outer face. (Fig. 5).

A counter-shaft 47 is placed parallel with shaft 32, in bearings 48 in the casing 7, and blades or cams 49 and 49$^a$ are arranged at the opposite ends of the shaft, each blade or cam having a hub 50, journaled on the shaft 47. Each blade or cam is provided with a pair of arc-shaped grooves 51 and 52 in its outer face, for engagement by the adjacent pin or roller 46, the said grooves intersecting at the end adjacent to shaft 47.

Each of the hubs 50 is provided with a radial arm 53 extending at right angles to the cam, and a rod is connected to each arm. The rods 54 and 54$^a$, are slidable in the before mentioned cross webs or diaphragms 22, which extend across casing 7, and each rod is provided with a fork 56 at its front end. The arms of the forks are arranged on opposite sides of the arms 53, and are pivoted thereto, so that when either hub 50 is oscillated the rods are moved longitudinally.

Each of the rods 54 and 54$^a$ is provided with an inwardly extending arm 57 for rod 54 and 57$^a$ for rod 54$^a$, and each arm is forked at its inner end, for engaging an annular groove in the hub of a gear wheel. The arm 57 engages the hub of a gear wheel 58, and the arm 57$^a$ that of a gear wheel 59. The gears 58 and 59 are the shifting gears for the different speeds of the transmission mechanism and the said transmission mechanism may be of any desired or usual construction.

It will be evident from the description, that when the selective lever 34 is swung laterally out of the passage 36 it will engage one of the lugs 42 or 42$^a$, and when the lever is then moved angularly of the shaft 32 it will follow the guideway 37 or 38, with which it is in register, and will oscillate the sleeve 40 or 40$^a$, connected to the jaw. If for instance the lever is in guideway 37, sleeve 40 will be oscillated, and arm 45 will be swung. The pins 46, in the neutral position of the lever 34, occupy a position at the junction of the grooves 51—52. (Fig. 5). Should for instance the lever 34 be moved forwardly in passage 37, as shown in Fig. 3, the pin 46 will move into groove 52 swinging the blade 49 downwardly, and arm 53 upwardly. Rod 54 will be moved longitudinally toward the flywheel, moving gear 58 toward the flywheel. A rearward movement of lever 34, as shown in Fig. 4, will swing blade 49 and arm 53 in the opposite direction, moving rod 54 and gear 58 in the opposite direction. Should lever 34 be engaged with jaw 41$^a$—42$^a$, gear wheel 59 will be moved in the same manner as described for gear 58. Shaft 32 also operates the clutch 8—8$^a$—8$^b$, through cam 31. The highest portion of the said cam is in engagement normally, that is, when lever 34 is in neutral position, with a roller 60, journaled on a pin 61, in the arms of a fork 62, connected to a socket 63, into which one end of a link 64 is threaded. The other end of the link is provided with a fork 65, whose arms engage opposite sides of a radial arm 66 on the shaft 23.

The shaft 23, operates the clutch 8—8$^a$—8$^b$ as before mentioned, and when the cam 31 is in the normal position of Fig. 1, the clutch sections are disengaged. When the selective lever has been moved in either direction, in either guideway, as soon as the lever reaches the end of the guideway, as shown in Figs. 3 and 4, the cam 31 releases roller 60, and permits shaft 23 to swing free, and permits spring 14 to force the clutch sections 8$^a$ and 8$^b$ toward section 8. The first movement of lever 34 from neutral position operates the gear wheel of the transmission mechanism to connect the proper gears, and when the gears of the transmission mechanism are fully engaged, the clutch sections 8$^a$ and 8$^b$ are released to permit the spring 14 to force them together. On the other hand the first movement of the selective lever to release or change gears loosens the clutch, and the clutch is not permitted to close, until the change is complete.

In the ordinary gear transmission mechanism, it is necessary to release the friction clutch, usually with a foot pedal, then select the gear with the hand lever, and after the gear has been selected and connected, the clutch is then again closed by releasing the foot from the pedal. In the present invention, the clutch and the gears are controlled by a single hand lever, and the transmission may have three forward speeds and one reverse. When the selective lever is at neutral position, all the gears are disconnected, and the friction clutch is released. When the selective lever is moved into either guideway, the selected gear, whatever the speed, either forward or reverse, is first fully brought into mesh, at the very beginning of the movement of the lever from neutral position, and the further movement of the lever will release the clutch, and permit the spring to close the same. In addition, none of the transmission gears will be moved while the clutch is closed.

The gears 58 and 59 are slidable on a squared portion of the transmission shaft, so that while they are freely movable longitudinally thereof they must rotate with respect thereto. Each of the said gears 58 and 59 is adapted to mesh with two gears of the transmission, not shown, so that when either gear is moved in either direction, a speed will be obtained. Four changes are thus permitted, that is three speeds forward, and one reverse. Since the transmission mechanism forms no part of the invention, it is not thought necesary to further show or describe the same.

We claim:

1. A device of the character specified, comprising a crank shaft, a transmission shaft, a clutch for connecting the crank shaft and the transmission shaft, a spring normally pressing the clutch sections together, means for holding the sections apart, an operating shaft, a casing in which the shaft is journaled, a collar secured to the shaft, a selective lever connected to the collar for swinging movement longitudinal to the shaft, a sleeve on the shaft on each side of the collar, an arm on the inner end of each sleeve, each arm having a lug extending toward the lever, said casing having a pair of parallel guideways extending transverse to the shaft for holding the lever in engagement with the lug of the adjacent arm, said casing having a passage connecting the guideways at the neutral position of the lever, a gear transmission mechanism for connecting the transmission shaft to the axle at different speeds, means operated by the angular movement of the lever in either direction and in either guideway for operating said transmission mechanism, and a connection between the lever and the holding means for releasing the same at the end of the movement of the lever.

2. In a transmission mechanism for motor vehicles, a drive shaft, a transmission shaft, a plurality of means for connecting the said shafts to cause them to rotate at different speeds with respect to each other, an operating shaft, an operating sleeve journaled on the shaft, on each side of the lever, a connection between the sleeves and the said connecting means to operate one of the said means when either sleeve is moved in either direction, a selective lever mounted to swing longitudinally of the operating shaft and to rotate the said shaft, an arm arranged on each side of the said lever, one of the arms being connected to each sleeve, each arm having a laterally extending lug for engagement by the lever to operate the sleeve when the lever is moved angularly with respect to the shaft, a pair of parallel guideways for guiding the lever in its angular movement when in engagement with either arm, said guideways having a communication for receiving the lever when in neutral position, and yielding means for normally retaining the lever in such position.

3. In a transmission mechanism for motor vehicles, a drive shaft, a transmission shaft, a plurality of means for connecting the said shafts to cause them to rotate at different speeds with respect to each other, an operating shaft, an operating sleeve on the shaft on each side of the lever, a connection between the sleeves and the said connecting means for operating one of the said means when either sleeve is moved in either direction, a selective lever mounted to swing longitudinally of the operating shaft and to rotate the said shaft, a pair of guideways arranged alongside each other transversely of the operating shaft, said guideways having a communication for receiving the lever when the said lever is in neutral position, means connected with each sleeve adjacent to one of the guideways for engagement by the lever when in the guideway to move the sleeve, and yielding means for normally retaining the lever in the communication between the guideways.

4. In a transmission mechanism for motor vehicles, a drive shaft, a transmission shaft, a plurality of means for connecting the said shafts to cause them to rotate at different speeds with respect to each other, an operating shaft, an operating sleeve on the shaft, a connection between the sleeves and the said connecting means for operating one of the said means when either sleeve is moved in either direction, a selective lever mounted to swing longitudinally of the operating shaft and rotate the said shaft, a pair of guideways arranged alongside each other transversely of the operating shaft, said guideways having a communication for receiving the lever when the said lever is in neutral position, and means connected with each sleeve adjacent to one of the guideways for engagement by the lever when in the guideway to move the sleeve.

5. In a transmission mechanism for motor vehicles, the combination with the speed changing gears, of an operating shaft, sleeves on the ends of the shaft for operating the said gears, a selective lever mounted to swing longitudinally of the operating shaft and to rotate the said shaft, a pair of guideways arranged alongside each other transversely of the operating shaft, said guideways having a communication for receiving the lever when it is in neutral position, and means adjacent to each guideway and connected with the adjacent sleeve for engagement by the lever when in the guideway, each sleeve being connected with a speed changing gear for operating the same.

6. In a transmission mechanism for motor vehicles, the combination with the crank shaft and the transmission shaft, and a normally operative clutch for connecting the said shafts, of means for restraining the operation of the clutch, speed changing gears, an operating shaft, sleeves on the said shaft at the ends thereof and connected with the speed changing gears for shifting the said gears, a selective lever connected to the operating shaft to rotate the same and to swing longitudinally thereof, a pair of guideways extending transversely of the operating shaft, means in connection with each sleeve for engagement by the selective lever when in the adjacent guideway to move the sleeve, and a connection between the operating shaft and the clutch restraining mechanism for releasing the said mechanism when the speed changing gears have been shifted.

7. A device of the character specified, comprising a driving shaft, a transmission shaft, and a driven shaft, a clutch for connecting the driving shaft and the transmission shaft, a plurality of means for connecting the transmission shaft and the driven shaft to cause them to rotate at different relative speeds, a spring normally holding the clutch in operative position, an operating shaft arranged transversely of the transmission shaft, a selective lever mounted to swing longitudinally of the operating shaft and connected to the shaft to rotate the said shaft when the selective lever is moved angularly with respect to the shaft, a sleeve on the operating shaft on each side of the lever, an arm on each sleeve, said arm being arranged on opposite sides of the lever, each arm having a lateral inwardly extending lug for engagement by the lever, a pair of parallel guideways for holding the lever in engagement with the lug of either arm, said guideways having a communication at the neutral position of the lever, a connection between each sleeve and a plurality of connecting means for operating one of the said means when the sleeve is oscillated in either direction, and a connection between the operating shaft and the clutch for holding the clutch in inoperative position until near the end of its angular movement in either direction.

8. A device of the character specified, comprising a driving shaft, a transmission shaft, and a driven shaft, a clutch for connecting the driving shaft and the transmission shaft, a plurality of means for connecting the transmission shaft and the driven shaft to cause them to rotate at different relative speeds, a spring normally holding the clutch in operative position, an operating shaft arranged transversely of the transmission shaft, a selective lever mounted to swing longitudinally of the operating shaft and connected to the shaft to rotate the said shaft when the selective lever is moved angularly with respect to the shaft, a sleeve on the operating shaft on each side of the lever, an arm on each sleeve, said arms being arranged on opposite sides of the lever, a pair of parallel guideways for holding the lever in engagement with either arm, said guideways having a connection for receiving the lever and holding it in neutral position, a connection between each sleeve and a plurality of the connecting means for operating the said means when the sleeve is oscillated in either direction, and a connection between the operating shaft and the clutch for holding said clutch in inoperative position while the lever is in neutral position.

9. A device of the character specified, comprising a driving shaft, a transmission shaft, and a driven shaft, a clutch for connecting the driving shaft and the transmission shaft, a plurality of means for connecting the transmission shaft and the driven shaft to cause them to rotate at different relative speeds, a spring normally holding the clutch in operative position, an operating shaft arranged transversely of the transmission shaft, a selective lever mounted to swing longitudinally of the operating shaft and connected to the shaft to rotate the said shaft when the selective lever is moved angularly with respect to the shaft, an arm on each side of the lever for engaging the lever when moved angularly of the shaft, means for holding the lever in engagement with each arm, means between the said means for holding the lever in neutral position and for permitting it to pass into either guideway, a connection between each arm and a plurality of connecting means for operating the said means when the arm is moved in either direction, and a connection between the operating shaft and the clutch for holding the clutch in inoperative position when the lever is in neutral position.

ALOYSIUS B. BROCKMAN.
WILLIAM BROCKMAN.

Witnesses:
F. L. LEWIS,
R. B. McINTIRE.